United States Patent
Zhang et al.

(10) Patent No.: US 9,614,742 B1
(45) Date of Patent: Apr. 4, 2017

(54) ANOMALY DETECTION IN TIME SERIES DATA

(71) Applicant: Google Inc., Mountain View, CA (US)

(72) Inventors: Xinyi Zhang, San Jose, CA (US); Kevin Yu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 579 days.

(21) Appl. No.: 13/827,144

(22) Filed: Mar. 14, 2013

(51) Int. Cl.
*G06F 17/18* (2006.01)
*H04L 12/26* (2006.01)

(52) U.S. Cl.
CPC .............................. *H04L 43/0823* (2013.01)

(58) Field of Classification Search
CPC . G06Q 10/04; G06N 5/02; G06N 7/00; H04L 47/70; H04L 43/16; H04L 63/1408; H04L 63/1425; H04L 41/142; H04L 41/0677; H04L 2029/06054; H04L 41/042; H04L 41/0813; H04L 41/0816; H04L 41/12; H04L 43/0811; H04L 45/44; H04L 47/10; H04L 63/1416; H04L 63/1458; H04L 67/101; H04L 67/1029; H04L 67/1034; H04L 63/1441; H04L 63/145; G06K 9/00523; G06K 9/00536; G06F 11/0709; G06F 17/30454; G06F 17/30463; G06F 11/0751; G06F 9/5027; G06F 9/505; H04W 24/02; H04W 84/18
See application file for complete search history.

(56) References Cited

U.S. PATENT DOCUMENTS

| 4,291,269 | A  | 9/1981  | Nossen          |
| 6,023,295 | A  | 2/2000  | Pau et al.      |
| 6,625,569 | B2 | 9/2003  | James et al.    |
| 6,877,043 | B2 | 4/2005  | Mallory et al.  |
| 7,080,290 | B2 | 7/2006  | James et al.    |
| 7,523,016 | B1 | 4/2009  | Surdulescu et al. |
| 7,620,868 | B2 | 11/2009 | Tailliet et al. |

(Continued)

OTHER PUBLICATIONS

U.S. Appl. No. 13/480,042, filed May 24, 2012, Google Inc.

(Continued)

*Primary Examiner* — Kevin Bates
*Assistant Examiner* — Ranjan Pant
(74) *Attorney, Agent, or Firm* — McDermott Will & Emery LLP

(57) ABSTRACT

Described herein are systems, mediums, and methods for detecting blockage of network traffic at a network server. A signal representative of time series data associated with network traffic is received at a processor for analysis. A data segmentation algorithm and an anomaly detection algorithm are applied in series to the received data. The segmentation algorithm detects regime shifts in the data. Data between regime shifts is considered a segment of data. The anomaly detection algorithm analyzes each segment individually to determine whether anomalies exist in the segment. If a cyclic pattern is found in the segment, the cyclic pattern is extracted from the segment leaving a residual data for analysis. A probability distribution of the residual data is determined for analysis. When an anomaly is detected in the segment o based on the probability distribution of the residual data, it is determined that blockage has occurred on the network traffic.

16 Claims, 10 Drawing Sheets

(56) References Cited

U.S. PATENT DOCUMENTS

| | | | |
|---|---|---|---|
| 7,716,011 B2* | 5/2010 | Thibaux | G06K 9/00536 |
| | | | 702/179 |
| 7,802,165 B2 | 9/2010 | Jain et al. | |
| 7,869,544 B2 | 1/2011 | Sorna et al. | |
| 7,882,230 B2 | 2/2011 | Appleby et al. | |
| 8,090,592 B1 | 1/2012 | Goodall et al. | |
| 8,504,882 B2 | 8/2013 | Li et al. | |
| 8,806,313 B1 | 8/2014 | Yu et al. | |
| 8,812,586 B1* | 8/2014 | Kulkarni | H04L 41/065 |
| | | | 709/203 |
| 8,868,993 B1* | 10/2014 | Yu | H04L 1/0045 |
| | | | 714/747 |
| 8,949,677 B1* | 2/2015 | Brundage | G06F 11/0745 |
| | | | 714/48 |
| 8,954,361 B1* | 2/2015 | Phillips | G06Q 40/00 |
| | | | 706/12 |
| 2002/0055826 A1 | 5/2002 | Wegerich et al. | |
| 2003/0079160 A1 | 4/2003 | McGee et al. | |
| 2003/0126289 A1 | 7/2003 | Aggarwal et al. | |
| 2005/0220030 A1 | 10/2005 | Nagami et al. | |
| 2005/0234667 A1* | 10/2005 | Hilton | G01R 13/0254 |
| | | | 702/79 |
| 2008/0082299 A1 | 4/2008 | Samardzija et al. | |
| 2008/0153423 A1 | 6/2008 | Armstrong et al. | |
| 2008/0196100 A1* | 8/2008 | Madhavan | H04L 63/145 |
| | | | 726/22 |
| 2008/0271038 A1 | 10/2008 | Rolia et al. | |
| 2009/0017758 A1* | 1/2009 | Dorneich | G06K 9/00523 |
| | | | 455/62 |
| 2009/0018798 A1 | 1/2009 | Dorneich et al. | |
| 2009/0125714 A1 | 5/2009 | Khosmood et al. | |
| 2010/0023282 A1 | 1/2010 | Lewis et al. | |
| 2010/0027432 A1* | 2/2010 | Gopalan | H04L 41/142 |
| | | | 370/252 |
| 2010/0071061 A1* | 3/2010 | Crovella | H04L 63/1425 |
| | | | 726/23 |
| 2010/0106752 A1 | 4/2010 | Eckardt et al. | |
| 2010/0290346 A1* | 11/2010 | Barford | H04L 41/064 |
| | | | 370/242 |
| 2011/0119374 A1* | 5/2011 | Ruhl | G06F 17/3089 |
| | | | 709/224 |
| 2011/0173015 A1 | 7/2011 | Chapman et al. | |
| 2011/0276887 A1* | 11/2011 | Cohen | H04L 41/142 |
| | | | 715/736 |
| 2012/0140671 A1 | 6/2012 | Bukofser et al. | |
| 2013/0085715 A1* | 4/2013 | Lakshminarayan | G06K 9/00536 |
| | | | 702/179 |
| 2013/0173215 A1* | 7/2013 | Patankar | G05B 23/0232 |
| | | | 702/179 |
| 2013/0227116 A1 | 8/2013 | Radhakrishnan et al. | |
| 2014/0114609 A1 | 4/2014 | Maurer et al. | |
| 2014/0172382 A1* | 6/2014 | Andrews | G06F 17/5009 |
| | | | 703/2 |
| 2015/0082432 A1 | 3/2015 | Eaton et al. | |

OTHER PUBLICATIONS

U.S. Appl. No. 13/488,875, filed Jun. 5, 2012, Google Inc.
Bosco, Bruno, et al, "A Robust Multivariate Long Run Analysis of European Electricity Prices," Nota di Lavoro, vol. 103, Sep. 2007, 29 pages.
Chen, Thomas M., "Network Traffic Modeling," The Handbook of Computer Networks, Hossein Bidgoli (ed.), Wiley, to appear 2007, 29 pages.
Escribano, Alvaro, et al.,"Modeling Electricity Prices: International Evidence," Working Paper 02-27, Economics Series 08, Departamento de Economia, Universidad Carlos III de Madrid, Spain, Jun. 2002, 32 pages.
Harvey, Andrew C., et al., "Trends and Cycles in Economic Time Series: A Bayesian Approach," Journal of Econometrics, vol. 140, 2007, pp. 618-649.
Huiqi Zhang, et al., "Change Point Detection based on Call Detail Records", IEEE, pp. 55-60, Jun. 8-9, 2011.
Jensen, Kare Jean, "Signal Processing for Distribution Network Monitoring." PhD Thesis, Technical University of Denmark, Department of Informatics and Mathematical Modeling, 1999, 219 pages.
Mahmoud A. Mahmoud et al., "A Change Point Method for Linear Profile Data", Quality and Reliability Engineering International, vol. 23, pp. 247-268, 2007.
US Notice of Allowance in U.S. Appl. No. 13/480,084 DTD Apr. 10, 2014.
US Office Action in U.S. Appl. No. 13/446,842 DTD Feb. 11, 2015.
US Office Action in U.S. Appl. No. 13/446,842 DTD Aug. 26, 2014.
US Office Action in U.S. Appl. No. 13/480,084 DTD Nov. 5, 2013.
US Office Action in U.S. Appl. No. 13/483,601 DTD Jan. 16, 2015.
US Office Action in U.S. Appl. No. 13/488,875 DTD Aug. 26, 2014.
US Office Action in U.S. Appl. No. 13/826,994 DTD Jul. 7, 2015.
US Office Action U.S. Appl. No. 13/446,842 DTD Jun. 22, 2015.
Zhang, Michael, et al, "A Nonlinear Autoregressive Conditional Duration Model with Applications to Financial Transaction Data" Graduate School of Business, University of Chicago, Jul. 1999, 53 pages.
Bandara, Vidarshana W. et al., "Extracting Baseline Patterns in Internet Traffic Using Robust Principal Components", 2011, 36th Annual IEEE Conference on Local Computer Networks, IEEE.
Du, Ping et al., "Detecting and Tracing Traffic Volume Anomalies in SINET3 Backbone Network", 2008, IEEE Communications Society, IEEE.
Hellerstein, Joseph M., "Quantitative Data Cleaning for Large Databases", Feb. 27, 2008, United Nations Economic Commission for Europe.
Malliga, S. et al., "Filtering Spoofed Traffic at Source End for Defending Against DoS/DDoS Attacks", 2008, Proceedings of the 2008 International Conference on Computing, Communication and Networking, IEEE.
Patcha, A. et al. 'An overview of anomaly detection techniques: existing solutions and latest technological trends', Computer Networks, vol. 51, Issue 12, pp. 3448-3470, Aug. 22, 2007.
US Advisory Action U.S. Appl. No. 13/446,842 DTD Oct. 2, 2015.
US Notice of Allowance on U.S. Appl. No. 13/480,042 DTD Dec. 15, 2015.
US Notice of Allowance on U.S. Appl. No. 13/480,042 DTD Mar. 23, 2016.
US Office Action in U.S. Appl. No. 13/480,124 DTD Aug. 12, 2014.
US Office Action in U.S. Appl. No. 13/251,080 dated Jul. 11, 2014.
US Office Action on U.S. Appl. No. 13/569,688 DTD Jan. 14, 2016.
US Office Action on U.S. Appl. No. 13/826,994 DTD Dec. 22, 2015.
US Office Action on U.S. Appl. No. 13/480,042 DTD Aug. 13, 2015.
Office Action issued Jul. 1, 2016 in U.S. Appl. No. 13/569,688.
Notice of Allowance issued Sep. 22, 2016 in U.S. Appl. No. 13/569,688.
Punskaya, Elena, et al. Bayesian Curve Fitting Using MCMC With Applications to Signal Segmentation, IEEE Transactions on Signal Processing, vol. 50, No. 3, Mar. 2002, pp. 747-758.
Schleip, Christoph. Climate change detection in natural systems by Bayesian methods. Doctoral dissertation, Technische Universität München, 2009, 139 pages.
Office Action issued Oct. 5, 2016 in U.S. Appl. No. 14/144,099.
Notice of Allowance issued Jan. 17, 2017 in U.S. Appl. No. 13/569,688.

* cited by examiner

ANOMALY DETECTION IN TIME SERIES DATA

BACKGROUND

Many signals derived from real world systems exhibit changes over time. Some of the changes may be anomalous behaviors, such as sudden and unexpected changes like spikes or dips in the signal. An anomaly may correspond to a pattern in the signal that deviates from established normal behavior. Other changes may be relatively longer term changes such as a trend change in the signal, referred as regime shifts. It is often desirable to differentiate between the regime shifts and the anomalies in the signal. Traditional single, monolithic algorithms to detect anomalies are challenged to separate a regime shift from an anomaly.

Systems and methods to detect anomalies while accounting for regime shifts would therefore be of great benefit in offline data analysis. It is also important to reduce the false alarms by differentiating between an anomaly and noise.

SUMMARY

Accordingly, the systems, mediums and methods described herein include, among other things, detection of an anomaly in a time-series signal and determining service blockage at a network server based on the detected anomaly.

According to various embodiments, time series data is received, for example, at a processor. Zero or more regime shift points are identified in the received time series data. One or more segments of data are determined based on the identified zero or more regime shift points such that a segment of data exists before and after an identified regime shift. For each segment, if a cyclic pattern is identified, the cyclic pattern is extracted from the segment to obtain residual data. A probability distribution of the residual data is calculated. An anomaly detection algorithm detects whether an anomaly exists in the probability distribution of the residual data.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
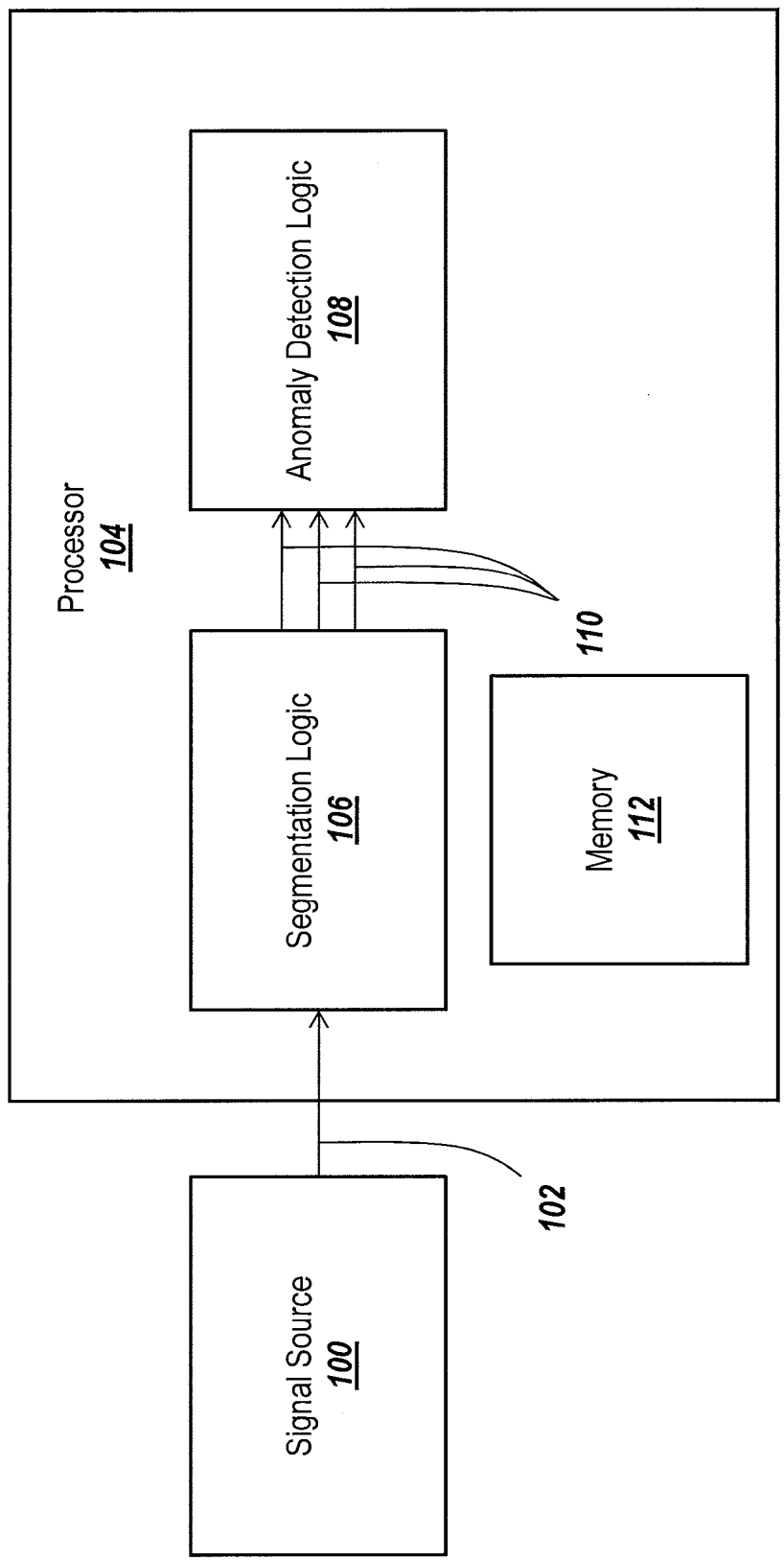
FIG. 1 depicts an exemplary processor receiving a signal from a signal source for analysis.

The present invention concerns detecting anomalies in time series data. For example the methods described herein may detect anomalies in a signal representative of network traffic data. The methods described herein may be used to determine a blockage of the network traffic at a network server. The signal may be an offline signal, i.e. the signal is formed of batches of data gathered for a fixed time frame. That is, in some embodiments, the offline signal is not real-time or live.

The received signal may pass through data segmentation logic and anomaly detection logic. In particular, a data segmentation algorithm and an anomaly detection algorithm are applied in series to the received signal. The segmentation algorithm chops the signal into multiple segments where each segment correspond to a trend in the signal. The signal is segmented by first detecting regime shifts in the signal. A regime shifts occurs when the trend in the received signal changes. A trend corresponds to long-term fluctuations in the signal. According to some embodiments, long-term may be defined to be minimum two cyclic pattern length or more. For example, the signal that record Traffic Per Second visiting a finance website shows an obvious weekly cycle. There is significantly more traffic on Monday through Friday and much less traffic on weekends. In this case, long term may be defined to be minimum 2 weeks (or longer). There exists a first trend before a regime shift point and a second trend after the regime shift point. Data points between the regime shift points are considered a segment of the signal that traces a given trend.

When the segments are identified in the signal, each segment is analyzed individually by the anomaly detection algorithm to determine whether anomalies exist in the segment. The anomaly detection algorithm determines whether a cyclic pattern exists in the segment. If a cyclic pattern is found, the cyclic pattern is extracted from the segment leaving residual data for analysis. A probability distribution of the residual data is determined for analysis. The probability distribution of the residual data is analyzed to determine whether an anomaly exists in the segment. An anomaly can be a transient change, such as a spike or a dip in the signal. According to various embodiments, when an anomaly is detected, it may be determined that blockage has occurred on the network traffic when the signal represents magnitude of network traffic on various portions of the network.

By segmenting the signal and identifying anomalies in each segment, the systems and methods described herein offer several advantages over conventional methods for anomaly detection. In particular, statistics-based anomaly detection described herein is robust and is not as susceptible to noise as other methods. In addition, statistics-based anomaly detection have lower false alarm rates compared to other methods because the segmentation occurs before anomaly identification. Statistics based anomaly detection is therefore particularly suitable for applications in network traffic management, which require accurate identification of anomalies to ensure network efficiency and security. However, in general, the systems and methods described herein are applicable to identifying anomalies in any type of signal.

FIG. 1 illustrates an exemplary processor 104. As used herein, the term "processor" or "computing device" refers to one or more computers, microprocessors, logic devices, servers, or other devices configured with hardware, firmware, and/or software to carry out one or more of the techniques described herein. An illustrative computing device 700, which may be used to implement any of the processors described herein, is described in detail below with reference to FIG. 7.

The processor 104 may receive a signal 102 from a signal source 100. As an example, the signal source 100 may include a device that monitors an amount of traffic flow in a network, and the signal may be a vector of discrete samples corresponding to an amount of traffic flow in the network as a function of time. According to various embodiments, the signal 102 may be an offline signal, i.e. may be formed of batches of data gathered for a fixed time frame. In an example, the signal 102 may correspond to a number of data packets arriving at a particular node in the network in a given time window. The signal source 100 may further be configured to process the signal to get the signal 102 into a certain form, such as by controlling the amplitude of the signal or adjusting other characteristics of the signal. For example, the signal source 100 may quantize, filter, smooth, downsample, upsample, or interpolate the signal, or perform any number of processing techniques on the signal 102. In general, any signal source may be used, if it is desirable to detect anomalies in the provided signal.

The processor 104 may include segmentation logic 106, anomaly detection logic 108 and a memory unit 112. The segmentation logic 106 and the anomaly detection logic 108 may be applied to the signal 102 in series. The segmentation logic 106 may segment the signal 102 into multiple segments 110 by first detecting one or more regime shift points in the signal 102. The regime shift points correspond to identified points in the signal 102 where the underlying distribution of the signal 102 changes. In some embodiments, the regime shift points may be identified based on changes in a statistic, such as mean and median of the signal 102. These methods are described in further detail in connection with FIGS. 3A-3C.

Figure 3A:
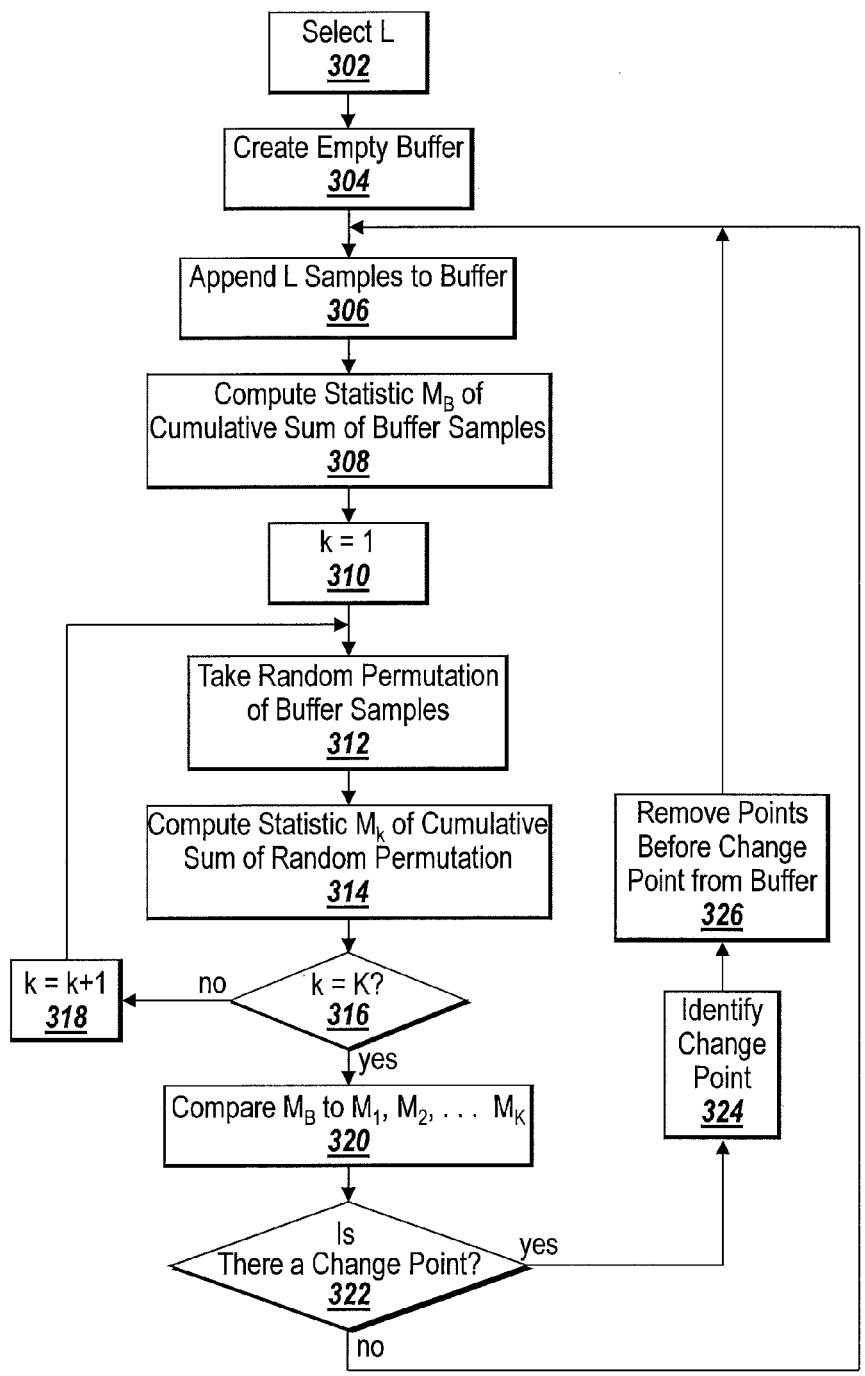
FIG. 3A is a flowchart describing identifying changes in the mean of a signal in accordance with an exemplary embodiment.
Figure 3B:
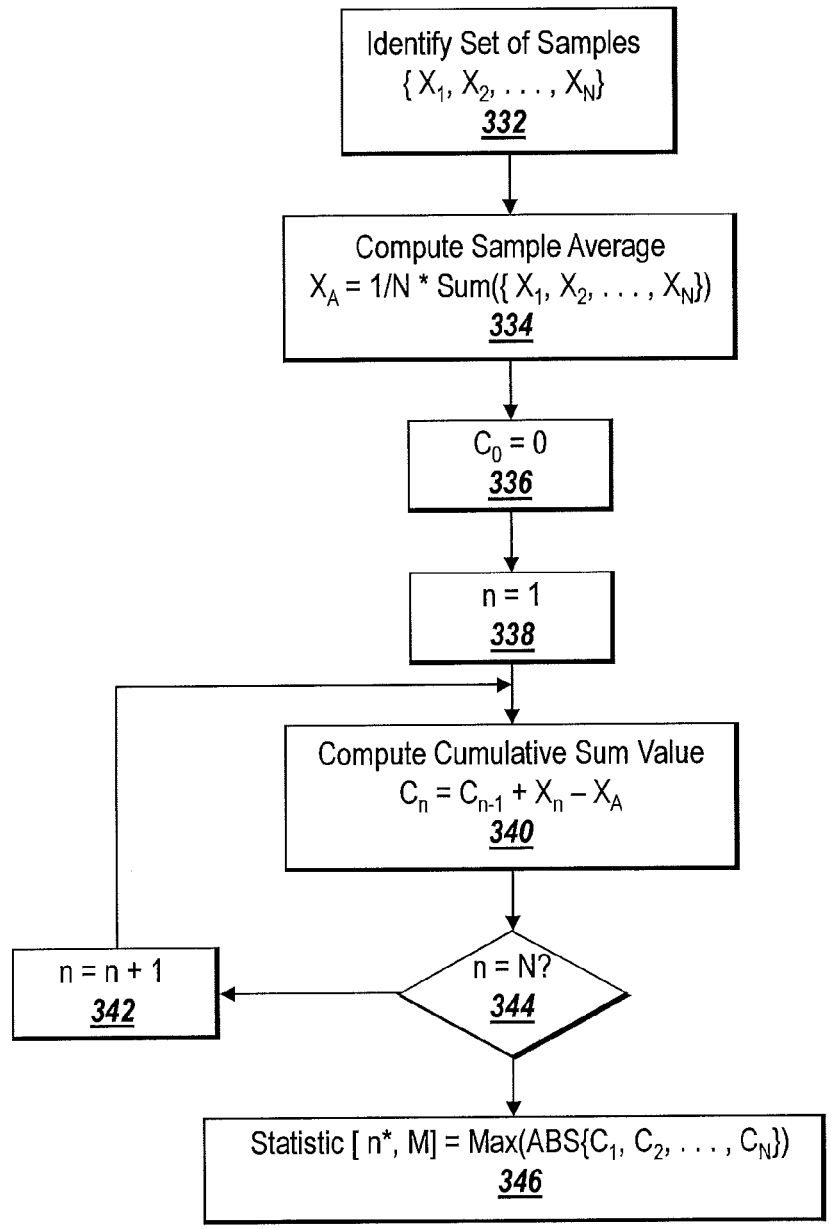
FIG. 3B is a flowchart describing how a statistic M is computed in a set of samples in accordance with an exemplary embodiment.
Figure 3C:
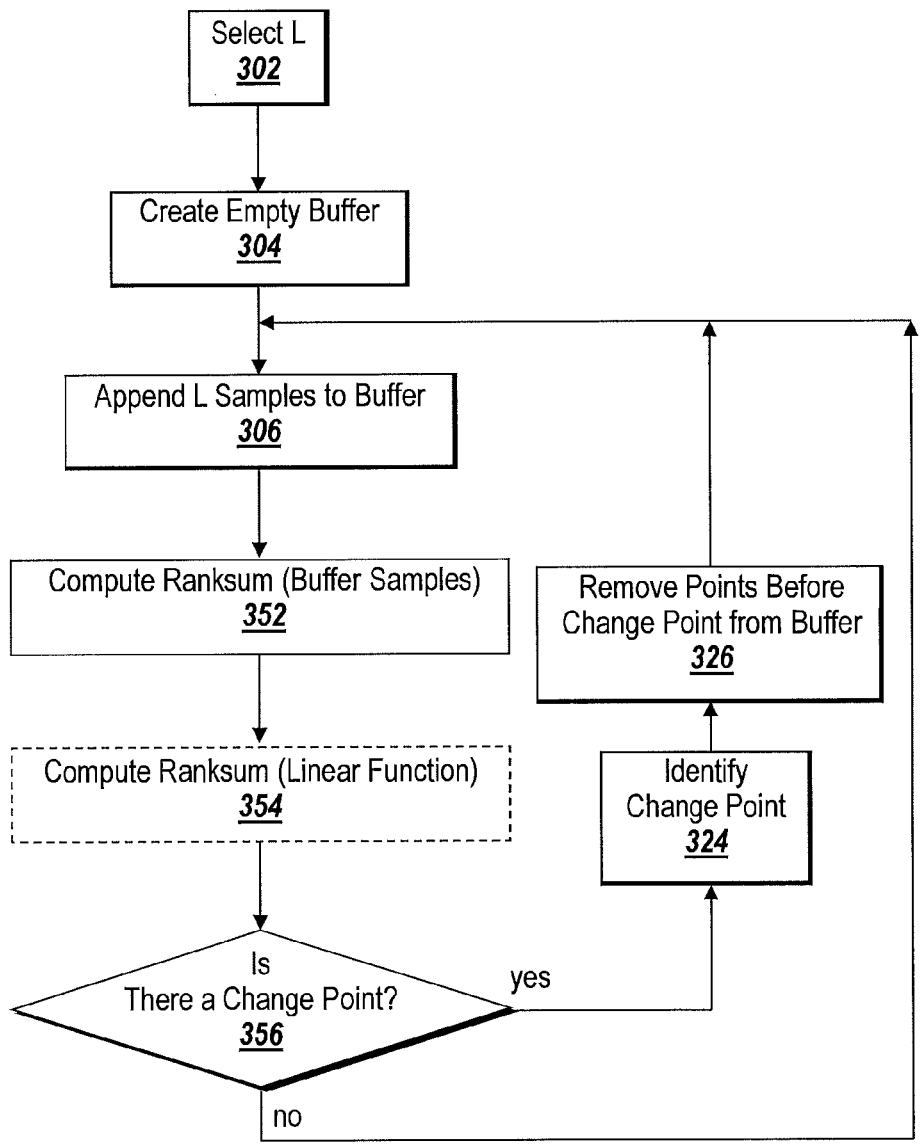
FIG. 3C is a flowchart describing identifying changes in the median of the signal in accordance with an exemplary embodiment.

When the regime shift points are determined using one or more of the methods illustrated in FIGS. 3A-3C, the signal 102 is segmented into multiple segments 110. Data points before and after each detected regime shift point form a segment 110. Once identified, the segments 110 are sent to the anomaly detection logic 108 for being individually analyzed to identify anomalies in each segment 110. The anomaly detection logic 108 estimates cyclic patterns, such as a diurnal or weekly pattern, in each segment 110 and extracts the identified cyclic pattern from each segment 110. The cyclical patterns may be determined and extracted from each segment 110, for example, using the method illustrated in FIG. 5. Removing the indentified cyclic pattern from each segment 110 leaves a residual data in the segment 110.

The anomaly detection logic 108 may process the residual data in the segment 110 using a statistical-based anomaly detection algorithm to detect the anomalies that may exist in the segment 110. An anomaly corresponds to a pattern in the segment 110 that deviates from established normal behavior. Identifying anomalies in a signal, or a segment 110, is useful for many reasons. For example, the signal 102 received from the signal source 100 may represent an amount of data traffic activity in a network. Network traffic is often bursty, meaning the signal 102 includes unexpected and unpredictable bursts in activity. These traffic bursts may be identified as anomalies in the signal 102 representative of an amount of network traffic over time. Identifying these bursts is important for characterizing activity levels in the network. In an example, the detected anomalies may be indicative of network activity blockage. In another example, if a large number of traffic bursts occurs at a specific location in a network, causing long latencies and poor network performance, one or more components at the network location may need to be replaced. For example, buffers that temporarily store incoming data at the network location may need to be replaced with larger buffers, which are better equipped to handle large amounts of data. Network traffic is just one example of where detection of anomalies may be useful. In general, anomaly detection is useful in a number of fields and may often lead to improved systems in multiple applications.

As provided above, the anomaly detection logic 108 may use statistics-based anomaly detection to detect anomalies in the segment 110. Hence, signal statistics are used to detect anomalies in the segment 110. In particular, a statistics-based anomaly detection method determines a range of signal sample values based on one or more estimated statistics of the segment 110. For example, the range may correspond to a number of standard deviations away from a mean of the sample values, and values that fall outside the range may be identified as anomalies.

Figure 2:
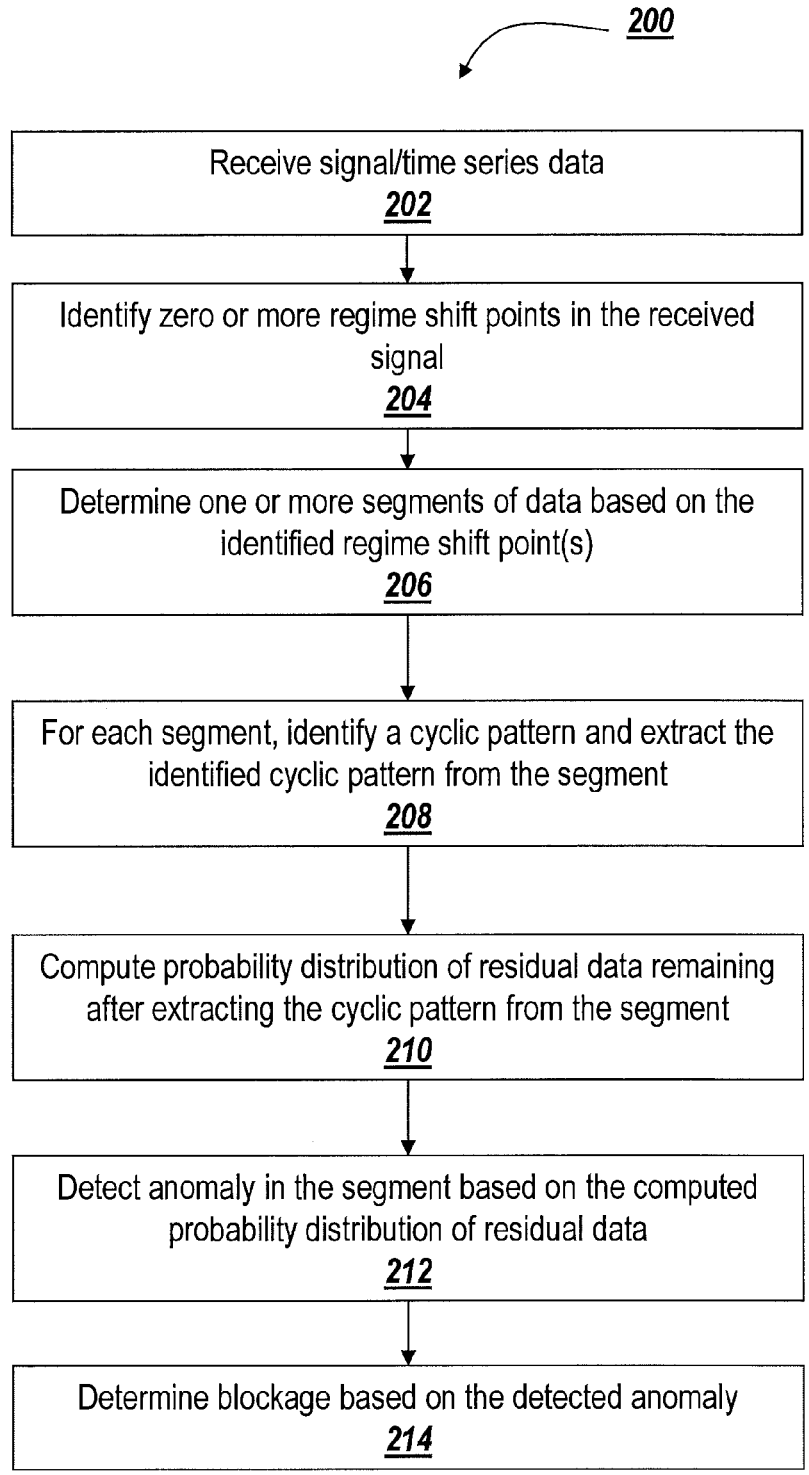
FIG. 2 is a flowchart describing exemplary steps performed by the processor in accordance with an exemplary embodiment.

FIG. 2 is a flowchart describing a method 200 performed by the processor in accordance with an exemplary embodiment. At step 202, the processor receives the signal or times series data from a signal source. At step 204, the segmentation logic of the processor identifies zero or more regime shift points in the received signal. That is, it is possible that the received signal does not include a regime shift point. At step 206, the segmentation logic determines one or more segments of data based on the identified regime shift points. Specifically, of there is no regime shift point in the received signal, the entire signal is determined as one segment. The details of identifying the regime shift points and the segments are discussed below in detail in connection with FIGS. 3A-3C. The identified segments are then passed to the anomaly detection logic of the processor. At step 208, the anomaly detection logic analyses each segment to identify a cyclic pattern in the segment. If a cyclic pattern is identified, the anomaly detection logic extracts the identified cyclic pattern from the segment. The details of identifying and extracting cyclic patterns from a segment are discussed below in detail in connection with FIG. 5. When the cyclic pattern is extracted from the segment, some residual data remains. At step 210, the anomaly detection logic computes a probability distribution of the residual data. At step 212, the anomaly detection logic detects one or more anomalies that may exist in the segment based on the probability distribution of the residual data. At step 214, the anomaly detection logic 108 determines that there has been a blockage on the network traffic based on the detected anomalies.

The following describes the details of detecting regime shift points in a signal and segmenting the signal into multiple segments.

In some embodiments, the regime shift points may be identified based on changes in a statistic, such as mean and median. The method 300 illustrated in FIG. 3A is used for identifying changes in the mean of the signal 102, and the method 350 illustrated in FIG. 3C is used for identifying changes in the median of the signal 102. The illustrated methods described herein are example techniques for identifying regime shift points in a received signal. In general, any other suitable technique may be used to identifying regime shift points.

First, at step 302, the segmentation logic 106 selects a parameter L, corresponding to an integer number of samples in the signal 102 and representative of a minimum number of samples in a segment 110. The segmentation logic 106 may select L in a number of ways. In an example, the segmentation logic 106 selects L based on a user input. In this case, the user input may be precisely L, or the segmentation logic 106 may process the user input to derive an appropriate value for L. For example, when the signal 102 is a function of time, the user input may be a length of a time window representative of an expected minimum length of a trend, such as an hour, a day, a week, or any other suitable length of time. The segmentation logic 106 would then multiply the user input by the sampling rate of the signal 102 to derive L.

The segmentation logic 106 may also select L based on known information about the signal 102 or the type of the signal 102. In addition, L may be fixed throughout the processing of the signal 102, or the segmentation logic 106 may be configured to use different values for L for different portions of the signal 102. For example, the value selected for L may be dependent on the values and/or rate of the incoming samples from the signal 102.

At step 304, the segmentation logic 106 creates an empty buffer. An empty buffer may be created by, for example, allocating an appropriate amount of space in the memory unit 112 of the processor 104 or initializing a number of variables.

At step 306, the segmentation logic 106 appends L samples of the signal 102 to the buffer. In particular, the L samples correspond to the first L samples in the signal 102, and the order of these L samples is maintained in the buffer. For example, when an amount of space in the memory unit 112 is allocated for the buffer, locations in the memory unit 112 may be used to store the appended samples to the buffer. Alternatively, the received samples in the signal 102 may already have corresponding storage locations, and these samples may simply be labeled with a flag variable indicating whether the sample is included in the buffer or not. Because of the minimum length parameter of a segment L, it is assumed that at most one regime shift point exists in the buffer at a time. This means that the samples in the buffer at any time include at most two segments. A goal of the method 300 illustrated in FIG. 3A is to determine whether a regime shift point exists in the buffer based on a change in a mean of the two segments (assuming that there are two segments).

At step 308, a first statistic $M_B$ is computed based on the signal 102 in the buffer. In particular, the statistic $M_B$ is representative of how likely a regime shift point exists in the buffer. The statistic $M_B$ is computed based on a cumulative sum of the samples in the buffer. An illustrative example of how the statistic $M_B$ may be computed is described below in relation to FIG. 3B.

At step 310, an iteration parameter k is initialized to 1. The iteration parameter k represents a label assigned to a random permutation to be performed on the buffer samples. In particular, after a random permutation is performed, the iteration parameter k is incremented (at step 318) until k reaches a total number of random permutations K. Any number of random permutations may be generated, and the number K of random permutations may be a parameter provided by the user. As an example, the number K may be fixed, or alternatively, the value for K may be related to the number of samples in the buffer or on the minimum segment length L. In particular, it may be desirable to use a smaller value for K for a buffer with a small number of samples compared to a buffer with a large number of samples. For example, for a buffer with length N, the total number of possible random permutations is $N \times (N-1) \times (N-2) \times \ldots \times 2 \times 1$, or N!. In some cases, it may be desirable to select K to be a certain percentage of all possible random permutations, such that the value for K may be selected based on N.

At step 312, a random permutation of the buffer samples is generated. In an example, a random permutation is a reordering of the buffer samples. In particular, a random permutation may be generated by sequentially selecting a random number uniformly distributed between 1 and N without replacement. However, in general, selection with replacement may also be used.

At step 314, the random permutation generated at step 312 is processed to compute a statistic $M_k$. In particular, the statistic $M_k$ is representative of how likely a regime shift point exists in the randomly permuted buffer samples. The statistic $M_k$ is computed based on a cumulative sum of the random permutation. An illustrative example of how the statistic $M_k$ may be computed is described in more detail in relation to FIG. 3B.

At decision block 316, the segmentation logic 106 determines whether the iteration parameter k is equal to the total number of random permutations K. If not, the segmentation logic 106 proceeds to step 318 to increment k and step 124 to take another random permutation of the buffer samples.

When k is equal to K, this means that the desired total number of random permutations have been performed, and the segmentation logic 106 proceeds to step 320 to compare the statistic $M_B$ to the set of $M_k$ values (i.e., $M_1, M_2, \ldots M_K$). In an example, comparing $M_B$ to $M_k$ includes identifying a number of $M_k$ values that are greater than $M_B$ and/or identifying a number of $M_k$ values that are less than $M_B$. In another example, a difference between $M_B$ and $M_k$ may be computed to determine whether a regime shift point exists in the buffer.

At decision block 322, the segmentation logic 106 determines whether there is a regime shift point in the buffer. In particular, the segmentation logic 106 determines whether the value for the statistic $M_B$ is significant compared to the set of values for $M_k$. In an example, the statistic $M_B$ is determined to be significant if $M_B$ is greater than a threshold number of $M_k$ values, such as 95%, 98%, 99%, or any other suitable amount. In another example, the statistic $M_B$ is determined to be significant if $M_B$ is greater by a threshold amount of one or more values for $M_k$. For example, decision block 322 may require that $M_B$ exceeds $M_k$ by a threshold amount, such as $M_k$ multiplied by 1.5, 2, 3, or any other suitable amount.

If the statistic $M_B$ is significant (i.e., there is a regime shift point in the buffer), the segmentation logic 106 proceeds to step 324 and identifies the regime shift point in the buffer. In particular, the regime shift point may be a buffer sample corresponding to a value of the cumulative sum in the original buffer sequence. As an example, the regime shift point may be related to the statistic $M_B$ computed at step 308.

After identifying the regime shift point in the buffer, the buffer samples are appropriately updated. In particular, at step 326, the points preceding the regime shift point are removed from the buffer. After updating the buffer, the segmentation logic 106 returns to step 306 to append the next L samples in the signal 102 to the buffer. In another example, if, after removing samples preceding an identified regime shift point from the buffer, the number of remaining samples is less than L, samples may be added to the buffer such that the number of buffer samples after adding new samples is L. In this case, the number of samples L may correspond to a desired total number of buffer samples.

Alternatively, if, at decision block 322, the segmentation logic 106 determines that there is no regime shift point in the buffer, the segmentation logic 106 returns directly to step 306 to append the next L samples to the buffer.

FIG. 3B is a flowchart illustrating an exemplary method 330 to compute a statistic M in a set of samples. Specifically, at step 332, the segmentation logic 106 identifies a set of samples. In particular, the set of samples corresponds to the samples in the buffer. There are N samples in the buffer, and the N samples are labeled as $\{X_1, X_2, \ldots, X_N\}$.

At step 334, the segmentation logic 106 computes a sample average. The sample average is denoted as $X_A$, and $X_A$ is the average of the buffer samples: $X_A = 1/N \Sigma_{i=1}^{N} X_i$.

At step 336, an initial cumulative sum variable $C_0$ is set to 0, and at step 146, an iteration parameter n is initialized to 1.

At step 338, the cumulative sum value $C_n$ is computed for multiple values of n (n=1, 2, ... N), where N is the number of samples in the received set. A cumulative sum of a set of samples is calculated by forming a sequence of partial sums of the samples. As an example, the cumulative sum value $C_n$ may be computed as $C_n = C_{n-1} + X_n - X_A$. In particular, the cumulative sum value $C_n$ may be computed by adding the previous cumulative sum value $C_{n-1}$ to the difference between the current sample value $X_n$ and the sample average $X_A$. Thus, the cumulative sum $C_n$ is a cumulative sum of the differences between the sample values and the sample average. These differences sum to zero, such that the cumulative sum ends at zero (i.e., $C_N=0$). Therefore, the cumulative sum sequence begins (i.e., $C_0=0$) and ends at zero.

The step 340 illustrates just one possible equation for computing a cumulative sum value. In general, any suitable method for computing a cumulative sum value may be used to compute a value for $C_n$. As an example, the cumulative sum value $C_n$ may be computed using the equation: $C_n = \Sigma_{i=1}^{n} (X_i - X_A)$ to give an equivalent result. Thus, each value in the cumulative sum corresponds to a partial sum of the differences between the buffer samples preceding and including the corresponding buffer sample and the sample average.

The iteration parameter n is incremented at step 342, and the next cumulative sum value $C_n$ is computed until n equals the total number of samples in the set N (determined at decision block 344), such that a complete cumulative sum sequence is computed. Once the complete cumulative sum sequence is formed, the segmentation logic 106 proceeds to step 346 to compute the statistic M as the maximum of the absolute values in the cumulative sum sequence. In addition, the index of the maximum absolute cumulative sum value may also be identified as n*.

As an illustrative example, assume that the buffer samples include a regime shift point, such that the first half (samples $X_1, X_2, \ldots X_{N/2}$) have high values $L_{high}$. The second half (samples $X_{N/2+1}, X_{N/2+2}, \ldots, X_N$) have low values. In this case, the average value is between $L_{high}$ and Low, such that the difference between $L_{high}$ and the average is positive, and the difference between Low and the average is negative. Thus, the cumulative sum sequence will increase during the first half of the sequence, and decrease during the second half of the sequence. In this example, the maximum absolute value in the cumulative sum $M_B$ is large because the first half of the buffer samples have high values above the average. Then, when the buffer samples are randomly permuted, the high and low values will likely mix. When the high and low values are not separated as described for the original order of the buffer samples, the cumulative sum sequence will have a smaller value for $M_k$. As an example, if the samples are mixed such that a high value is usually followed by a low value, and vice versa, the cumulative sum will generally be centered around zero, and the maximum absolute value of the cumulative sum will be small. Therefore, when comparing $M_B$ to the values $M_k$, it is expected that if a regime shift point exists in the buffer, then $M_B$ should be large compared to a typical value for $M_k$.

FIG. 3C is a flowchart illustrating an alternative method 350 for the segmentation logic 106 to identify regime shift points in the signal 102. Specifically, FIG. 3C is a flowchart illustrating identify regime shift points in the signal 102 by detecting changes in the median of the two segments in the buffer. First, steps 302, 304, and 306 of FIG. 3C are the same as described in relation to FIG. 3A. In particular, at step 302, the segmentation logic 106 selects a parameter L, corresponding to an integer number of samples in the signal 102 and representative of a minimum number of samples in a segment. At step 304, the segmentation logic 106 creates an empty buffer, and at step 306, the segmentation logic 106 appends L samples of the signal 102 to the buffer.

At step 352, a rank sum is computed based on the buffer samples. In particular, the buffer samples may be assigned labels corresponding to their rank in the buffer (i.e., the lowest valued buffer sample is assigned 1, the second lowest valued buffer sample is assigned 2, etc.). A rank sum corresponds to the partial sum of these labels.

At decision block 356, the segmentation logic 106 determines whether there is a regime shift point in the buffer based on the rank sum sequence computed at step 352. As an illustrative example, assume that the buffer samples include a shift point at the halfway point in the buffer, such that the first half (samples $X_1, X_2, \ldots X_{N/2}$) have lower values than the second half samples $X_N/2+1, X_N/2+2, \ldots, X_N$). In this case, the first half of the buffer samples have lower rank (1 to N/2) than the second half (N/2+1 to N). One way to detect the regime shift point is to iteratively select a sample $X_n$ in the buffer and determine whether the preceding samples ($X_1$ to $X_n$) have ranks 1 to n (corresponding to low values). This would mean that all buffer samples preceding the sample $X_n$ have lower rank than all buffer samples following the sample $X_n$. In this case, $X_n$ would represent a regime shift point indicative of a change in median.

An equivalent and more efficient way to detect the regime shift point is to compare the rank sum computed at step 352 to a rank sum of a linear sequence that is optionally computed at step 354. In particular, the linear sequence may be simply [1, 2, 3, ... N], such that if the rank sum of the buffer samples is ever equal to the rank sum of the linear sequence for a selected buffer sample, this would mean that the samples preceding the selected buffer sample would have lower rank than the following buffer samples. In this case, if a rank sum value of the buffer samples were equal to a corresponding value in the rank sum of the linear sequence, this would mean that the buffer samples preceding the sample corresponding to the rank sum value each have lower rank than each of the following buffer samples. Thus, this may be indicative that the corresponding sample in the buffer is a regime shift point. In another example, the linear sequence may be in decreasing order [N, N−1, ..., 2, 1]. Using the decreasing linear sequence would be useful for detecting regime shift points where the preceding samples have higher rank than the following buffer samples.

In some embodiments, it may be desirable to identify regime shift points for which not all preceding buffer samples have lower rank than each following buffer sample. For example, it may be desirable to identify a regime shift point if just one buffer sample is out of order. In this case, the requirement for identifying a regime shift point in the buffer using rank sum may be relaxed to include rank sum values that fall within some range around the linear sequence rank sum.

Steps 324 and 326 of FIG. 3C are the same as described in relation to FIG. 3A. In particular, if there is a regime shift point in the buffer, the segmentation logic 106 proceeds to step 324 and identifies the regime shift point in the buffer. After identifying the regime shift point in the buffer, the buffer samples are appropriately updated. At step 326, the points preceding the regime shift point are removed from the buffer. After updating the buffer, the segmentation logic 106 returns to step 306 to append the next L samples in the signal 102 to the buffer.

Alternatively, if, at decision block 356, the segmentation logic 106 determines that there is no regime shift point in the buffer, the segmentation logic 106 returns directly to step 306 to append the next L samples to the buffer.

Figure 4:
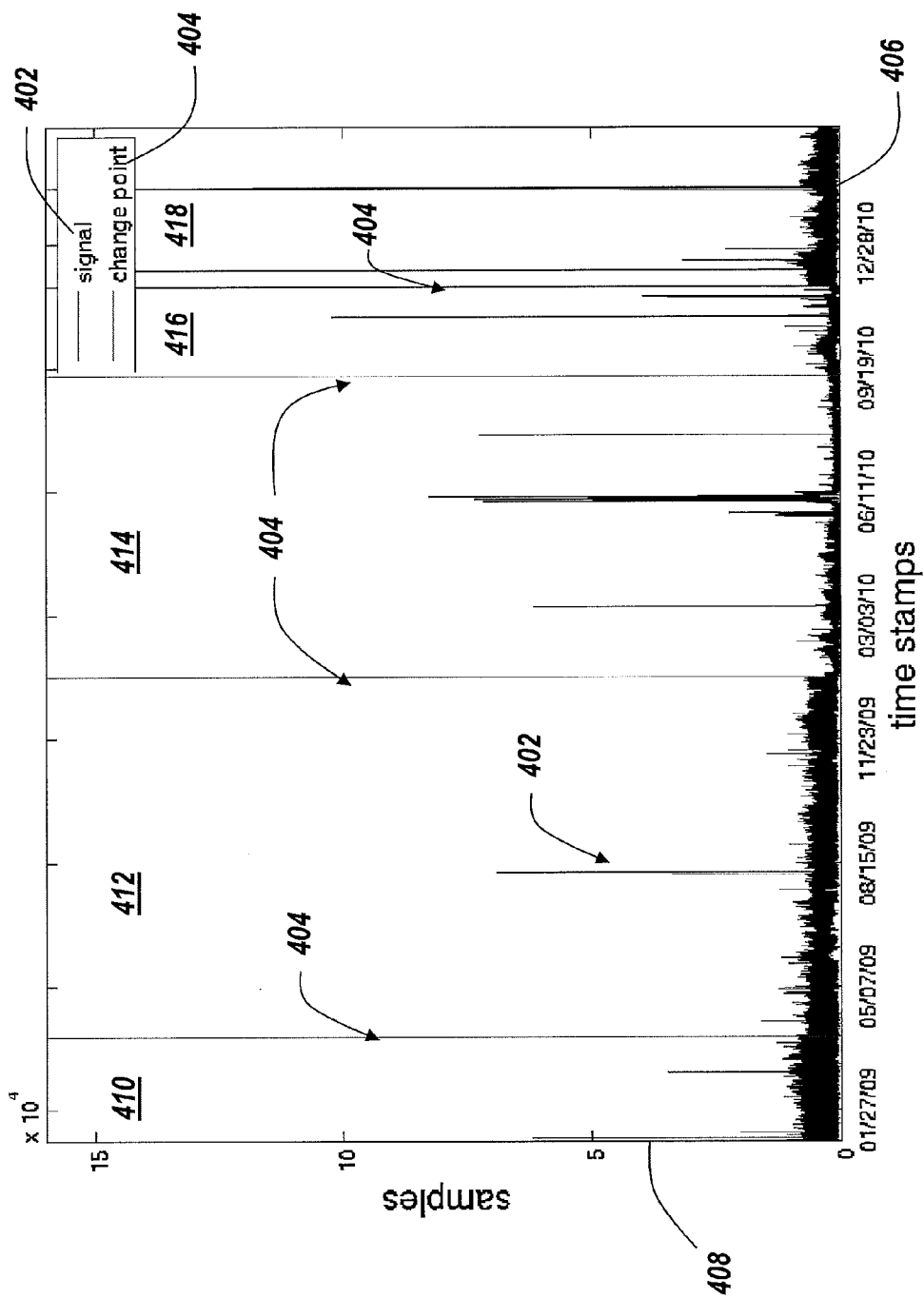
FIG. 4 depicts an exemplary plot illustrating multiple regime shift points identified in a received signal in accordance with an exemplary embodiment.

FIG. 4 illustrates multiple regime shift points 404 identified in a received signal 402. The received signal 402 may be graphically illustrated using a plot showing the amount of samples 408 at given time stamps 406. Applying the methods described above in connection with FIGS. 3A-3C, the regime shift points 404 may be identified in the received signal 402. Segments 410, 412, 414, 416 and 418 may be identified on each side of a given regime shift point 404. Once identified, the segments 410, 412, 414, 416 and 418 may be forwarded to the anomaly detection logic 108 for determining and extracting a cyclic pattern from each segment 410, 412, 414, 416 and 418.

The following describes the details of determining and extracting a cyclic pattern from a data segment.

Figure 5:
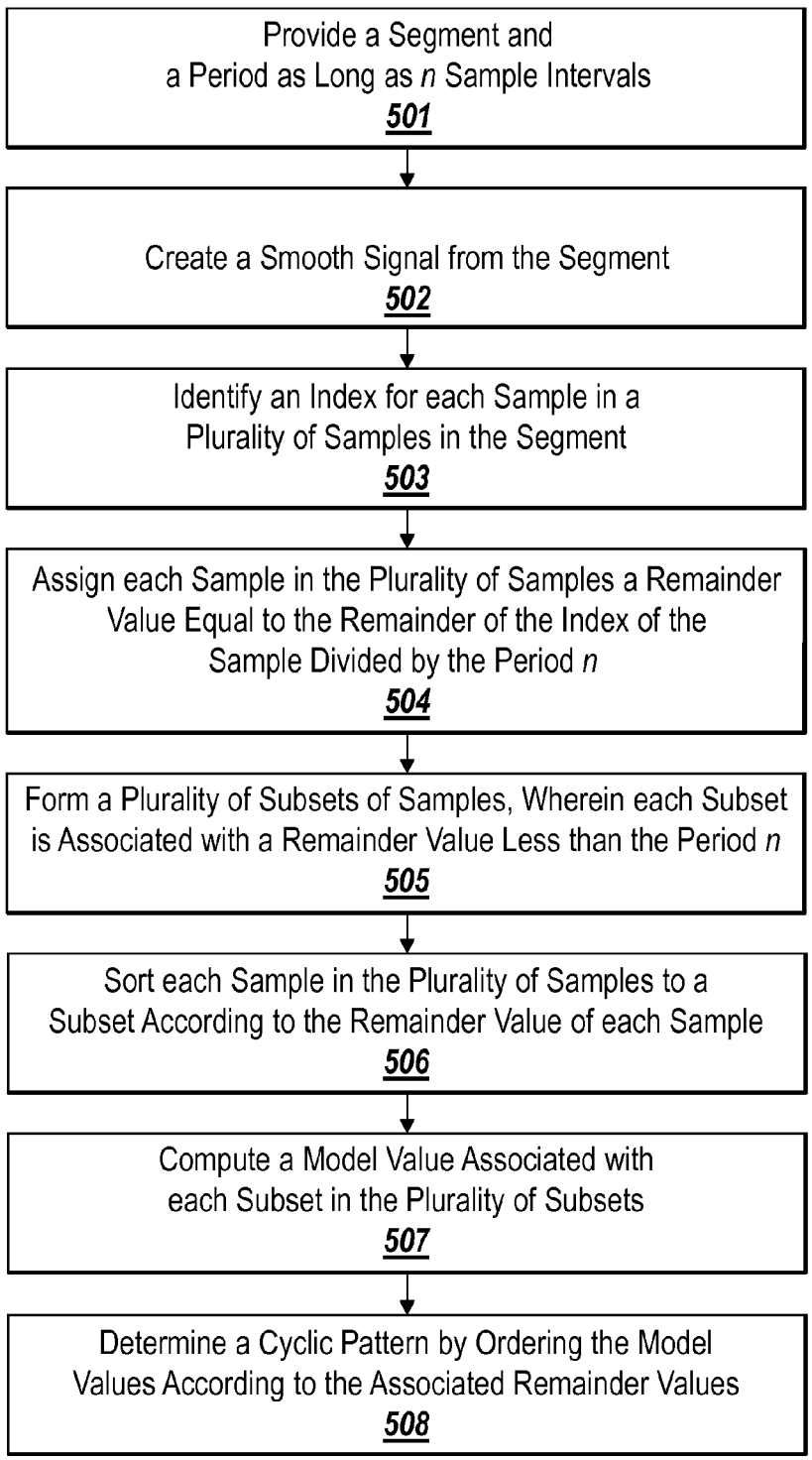
FIG. 5 is a flowchart illustrating a pattern extraction method for extracting a cyclic pattern from a signal or segment in accordance with an exemplary embodiment.

FIG. 5 is a flowchart illustrating a pattern extraction method 500 for extracting a cyclic pattern from a signal or segment. According to various embodiments, the segment maybe de-trended and smoothed using de-trending and smoothing techniques described in detail in U.S. patent application Ser. Nos. 13/446,842; 13/463,601 and 13/488,875, which are incorporated herein in entirety by reference.

The illustrative pattern extraction method 500 begins when a segment and a period as long as an integer n number of samples is provided in step 501. In step 502, a smoothed signal is created from the segment. The pattern extraction method 500 may then proceed to identify the data that will be used to determine the value of the cyclic pattern during each sampling interval of the period.

In step 503, an index is identified for each sample in a plurality of samples in the smoothed segment. In step 504, each sample is assigned a remainder value equal to the remainder of the index of the sample divided by n. As an illustrative example, consider a cyclic pattern with a period of one day in a signal consisting of one sample taken per hour for a calendar year. In this example, although a sample taken at midnight on January 1 would have an index of zero and a sample taken at midnight on January 3 would have an index of 48, both samples would have a remainder value of zero.

In step 505, a plurality of subsets of samples is formed in memory 112, with each subset associated with a remainder value less than n. In step 506, each sample in the plurality of samples is sorted to a subset according to the remainder value of each sample. In the illustrative example given above, a sample taken at midnight would be sorted into a subset associated with a remainder value of zero, regardless of whether the sample was taken on the first or the last day of the year; similarly, a sample taken at 3 PM would be sorted into a subset associated with a remainder value of 15. The plurality of subsets is then ready to serve as the basis for determining the cyclic pattern. In step 507, a model value associated with each subset in the plurality of subsets is computed. Step 508 orders the model values according to the associated remainder values, determining the cyclic pattern. In the illustrative example given above, the cyclic pattern for the first hour of a day might equal the average of all samples taken at midnight, the average of all samples taken at 1 AM for the second hour of a day, and so on.

As each model value is calculated from the available data associated with a remainder value, each model value is data-driven. As a model value is calculated for each remainder value, the cyclic pattern is determined for a time resolution equal to the sampling interval. Cyclic pattern extraction method 500 therefore does not use distorting assumptions on what the cyclic pattern may be, nor does method 500 determine a cyclic pattern with lower resolution than the segment in which the cyclic pattern is found.

Figure 6:
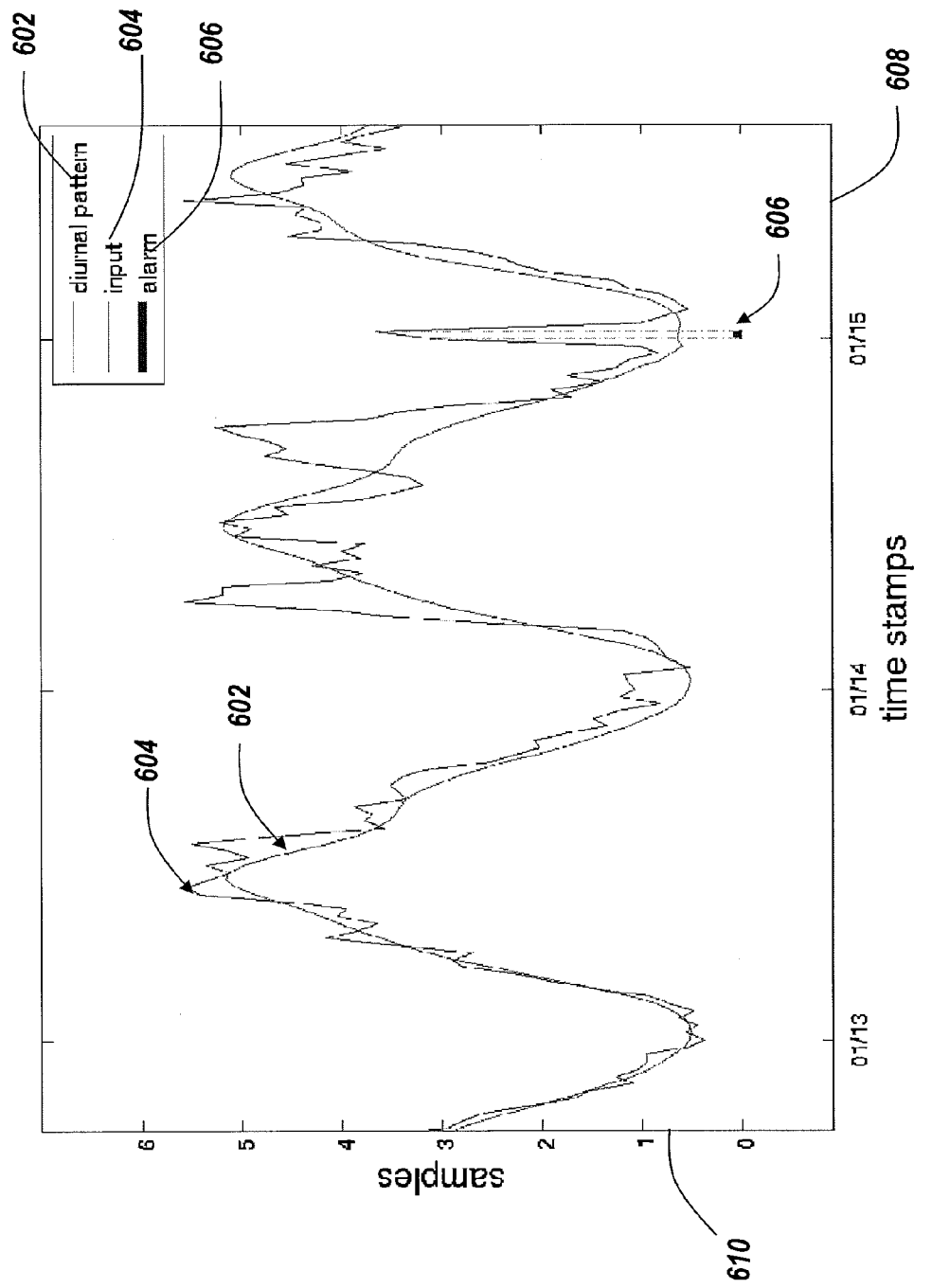
FIG. 6 depicts an exemplary plot illustrating an anomaly detected in a segment of the received signal in accordance with an exemplary embodiment.

FIG. 6 illustrates a cyclic pattern 602 extracted from a segment 604 of the received signal. The segment 604 of the received signal may be graphically illustrated using a plot showing the amount of samples 610 at given time stamps 608. Applying the methods described above in connection with FIG. 5, a cyclic pattern such as a diurnal pattern 602 may be identified and extracted from the segment 604. The anomaly detection logic 108 may process the residual signal (i.e., the difference between the segment 604 and the cyclic pattern 602) to detect the anomaly 606 using a statistical-based anomaly detection algorithm. In particular, statistics-based anomaly detection method determines a range of signal sample values based on one or more estimated statistics of the segment 604. For example, the range may correspond to a number of standard deviations away from a mean of the sample values, and values that fall outside the range may be identified as anomalies. The statistics-based anomaly detection is described in detail in U.S. patent application Ser. No. 13/569,688, which is incorporated herein in entirety by reference.

Figure 7:
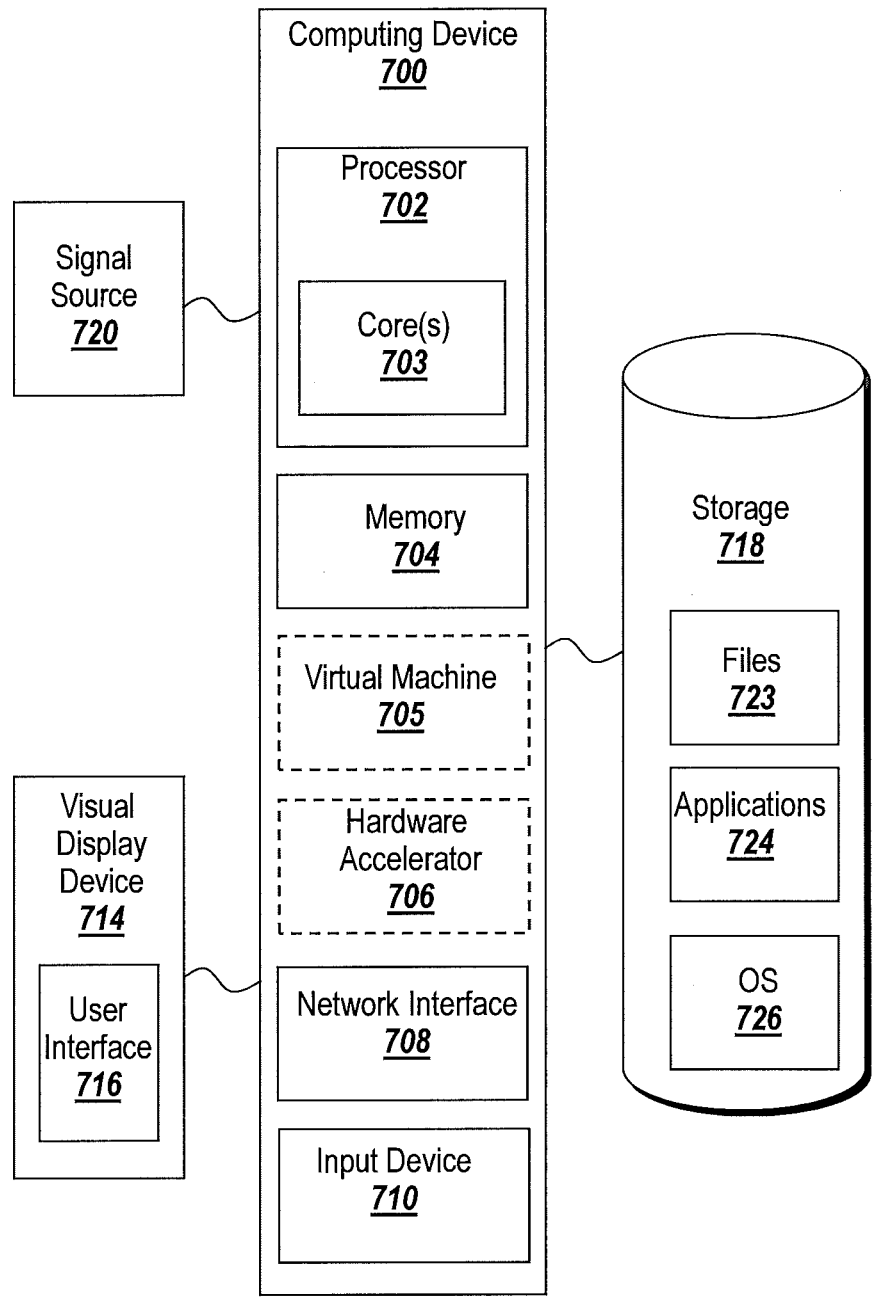
FIG. 7 depicts an exemplary computing device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 7 depicts an example of an electronic device 700 that may be suitable for use with one or more acts disclosed herein.

The electronic device 700 may take many forms, including but not limited to a computer, workstation, server, network computer, quantum computer, optical computer, Internet appliance, mobile device, a pager, a tablet computer, a smart sensor, application specific processing device, etc.

The electronic device 700 is illustrative and may take other forms. For example, an alternative implementation of the electronic device 700 may have fewer components, more components, or components that are in a configuration that differs from the configuration of FIG. 7. The components of FIG. 7 and/or other figures described herein may be implemented using hardware based logic, software based logic and/or logic that is a combination of hardware and software based logic (e.g., hybrid logic); therefore, components illustrated in FIG. 7 and/or other figures are not limited to a specific type of logic.

The processor 702 may include hardware based logic or a combination of hardware based logic and software to execute instructions on behalf of the electronic device 700. The processor 702 may include logic that may interpret, execute, and/or otherwise process information contained in, for example, the memory 704. The information may include computer-executable instructions and/or data that may implement one or more embodiments of the invention. The processor 702 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 703. Moreover, the processor 702 may include a system-on-chip (SoC) or system-in-package (SiP).

The electronic device 700 may include one or more tangible non-transitory computer-readable storage media for storing one or more computer-executable instructions or software that may implement one or more embodiments of the invention. The non-transitory computer-readable storage media may be, for example, the memory 704 or the storage 718. The memory 704 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 700 may include a virtual machine (VM) 705 for executing the instructions loaded in the memory 704. A virtual machine 705 may be provided to handle a process running on multiple processors so that the process may appear to be using only one computing resource rather than multiple computing resources. Virtualization may be employed in the electronic device 700 so that infrastructure and resources in the electronic device may be shared dynamically. Multiple VMs 705 may be resident on a single computing device 700.

A hardware accelerator 706, may be implemented in an ASIC, FPGA, or some other device. The hardware accelerator 706 may be used to reduce the general processing time of the electronic device 700.

The electronic device 700 may include a network interface 708 to interface to a Local Area Network (LAN), Wide Area Network (WAN) or the Internet through a variety of connections including, but not limited to, standard telephone lines, LAN or WAN links (e.g., T1, T3, 76 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 708 may include a built-in network adapter, network interface card, personal computer memory card international association (PCMCIA) network card, card bus network adapter, wireless network adapter, universal serial bus (USB) network adapter, modem or any other device suitable for interfacing the electronic device 700 to any type of network capable of communication and performing the operations described herein.

The electronic device 700 may include one or more input devices 710, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 700 may include other suitable I/O peripherals.

The input devices 710 may allow a user to provide input that is registered on a visual display device 714. A graphical user interface (GUI) 716 may be shown on the display device 714.

A storage device 718 may also be associated with the computer 700. The storage device 718 may be accessible to the processor 702 via an I/O bus. The information may be executed, interpreted, manipulated, and/or otherwise processed by the processor 702. The storage device 718 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 718 may further store applications 724, and the electronic device 700 can be running an operating system (OS) 726. Examples of OS 726 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 8:
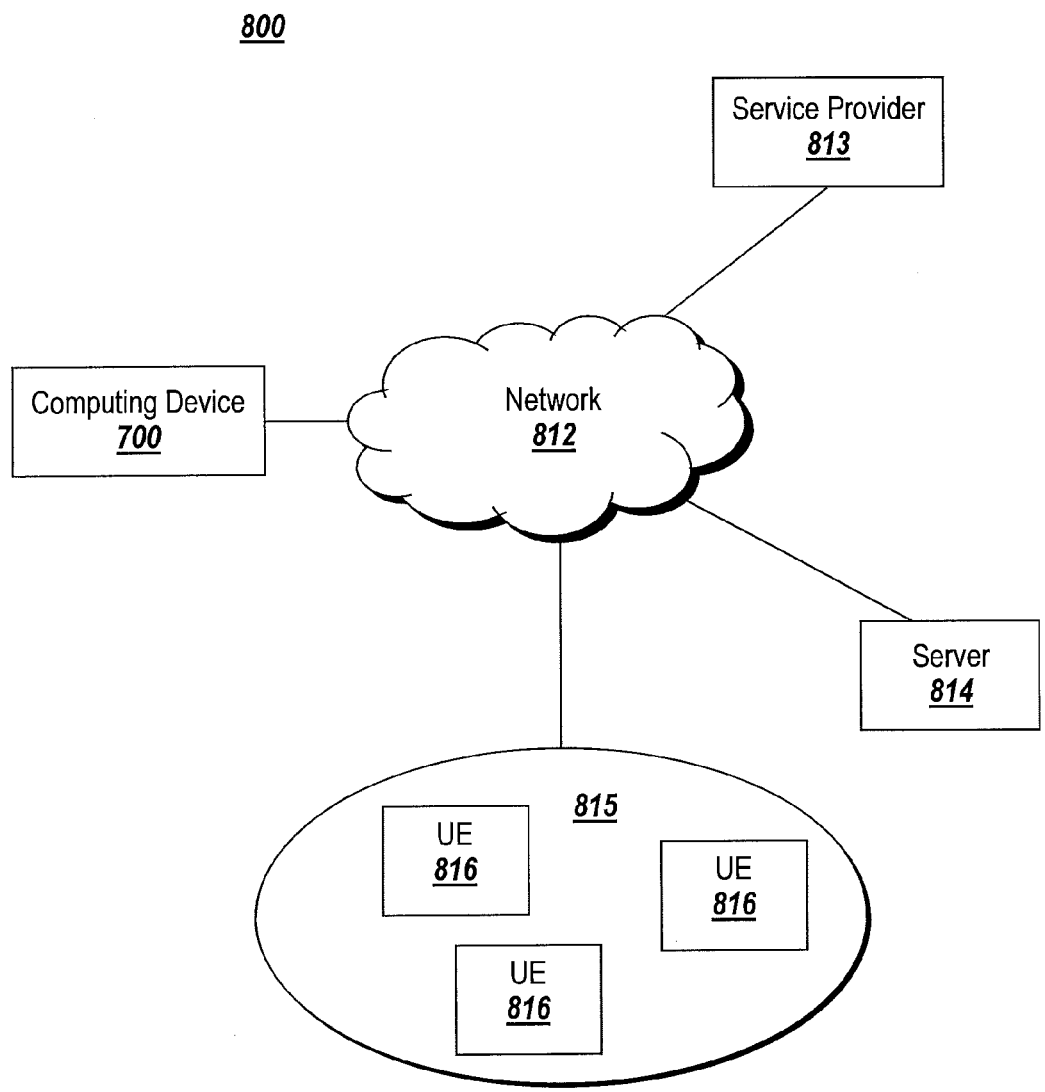
FIG. 8 depicts an exemplary network implementation of processing performed according to an exemplary embodiment.

FIG. 8 depicts a network implementation that may implement one or more embodiments of the invention. A system 800 may include a computing device 700, a network 812, a service provider 813, a target environment 814, and a cluster 815. The embodiment of FIG. 8 is exemplary, and other embodiments can include more devices, fewer devices, or devices in arrangements that differ from the arrangement of FIG. 8.

The network 812 may transport data from a source to a destination. Embodiments of the network 812 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 700, the service provider 813, etc.). Data may include digital information or analog information. Data may further be packetized and/or non-packetized.

The network 812 may be a hardwired network using wired conductors and/or optical fibers and/or may be a wireless network using free-space optical, radio frequency (RF), and/or acoustic transmission paths. In one implementation, the network 812 may be a substantially open public network, such as the Internet. In another implementation, the network 812 may be a more restricted network, such as a corporate virtual network. The network 812 may include Internet, intranet, Local Area Network (LAN), Wide Area Network (WAN), Metropolitan Area Network (MAN), wireless network (e.g., using IEEE 802.11), or other type of network The network 812 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 813 may include a device that makes a service available to another device. For example, the service provider 813 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 814 may include a device that receives information over the network 812. For example, the server 814 may be a device that receives user input from the computer 700.

The cluster 815 may include a number of units of execution (UEs) 816 and may perform processing on behalf of the computer 700 and/or another device, such as the service provider 813 or server 814. For example, the cluster 815 may perform parallel processing on an operation received from the computer 700. The cluster 815 may include UEs 816 that reside on a single device or chip or that reside on a number of devices or chips.

The units of execution (UEs) 816 may include processing devices that perform operations on behalf of a device, such as a requesting device. A UE may be a microprocessor, field programmable gate array (FPGA), and/or another type of processing device. UE 816 may include code, such as code for an operating environment. For example, a UE may run a portion of an operating environment that pertains to parallel processing activities. The service provider 813 may operate the cluster 815 and may provide interactive optimization capabilities to the computer 700 on a subscription basis (e.g., via a web service).

Units of Execution (UEs) may provide remote/distributed processing capabilities for the applications 824. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory electronic device readable storage medium storing instructions that, when executed, cause one or more processors to:
receive a network traffic signal in form of time series data from one or more network servers;
identify a set of regime shift points in the received network traffic signal based on varying statistical properties of the received network traffic signal;
determine a segment of the network traffic signal based on the identified the set of regime shift points;
identify that a cyclic pattern exists in the segment of the network traffic signal;
responsive to identifying that the cyclic pattern exists, extract the cyclic pattern from the segment of the network traffic signal;
generate a residual segment of the network traffic signal based on the segment of the network traffic signal and the extracted cyclic pattern;
compute a probability distribution of the residual segment of the network traffic signal;
detect that an anomaly exists in the segment of the network traffic signal based on statistical properties of the probability distribution of the residual signal;
responsive to detecting that the anomaly exists, determine that there is a blockage of network service among the one or more network servers based on a magnitude of the anomaly and a magnitude of the network traffic signal; and
responsive to detecting that the anomaly exists, reconfigure a network comprising the one or more network servers.

2. The medium of claim 1, wherein the received network traffic signal is offline data received for a pre-determined amount of time.

3. The medium of claim 1, wherein a regime shift occurs when a trend in the received network traffic signal changes.

4. The medium of claim 3, wherein a trend corresponds to one or more long-term fluctuations in the received network traffic signal.

5. The medium of claim 4, further storing instructions that, when executed, cause one or more processors to:
determine a first trend before an identified regime shift point and a second trend, different from the first trend, after the identified regime shift point.

6. The medium of claim 1, wherein a segment of the network traffic signal is a chunk of data that exists between two consecutive regime shift points.

7. The medium of claim 1, wherein a cyclic pattern is a repetitive periodic feature occurring in the segment of the network traffic signal.

8. A system, comprising:
a processor that receives a network traffic signal in form of time series data from one or more network servers, the processor executing:
segmentation logic for:
identifying a set of regime shift points in the received network traffic signal based on varying statistical properties of the received network traffic signal; and
determining a segment of the network traffic signal based on the identified the set of regime shift points; and
anomaly detection logic for:
identifying that a cyclic pattern exists in the segment of the network traffic signal;
responsive to identifying that the cyclic pattern exists, extracting the cyclic pattern from the segment of the network traffic signal;
generating a residual segment of the network traffic signal based on the segment of the network traffic signal and the extracted cyclic pattern;
computing a probability distribution of the residual segment of the network traffic signal;
detecting that an anomaly exists in the segment of the network traffic signal based on statistical properties of the probability distribution of the residual signal;
responsive to detecting that the anomaly exists, determine that there is a blockage of network service among the one or more network servers based on a magnitude of the anomaly and a magnitude of the network traffic signal; and
responsive to detecting that the anomaly exists, reconfigure a network comprising the one or more network servers.

9. The system of claim 8, wherein:
a regime shift occurs when a trend in the received network traffic signal changes; and
the trend corresponds to one or more long-term fluctuations in the received network traffic signal.

10. The system of claim 9, wherein the processor executes the segmentation logic for:
determining a first trend before an identified regime shift point and a second trend, different from the first trend, after the identified regime shift point.

11. The system of claim 8, wherein a segment of the network traffic signal is a chunk of data that exists between two consecutive regime shift points.

12. The system of claim 8, wherein a cyclic pattern is a repetitive periodic feature occurring in the segment of the network traffic signal.

13. A computer-implemented method comprising:
receiving, by a computing device, a network traffic signal in form of time series data from one or more network servers;
identifying, by the computing device, a set of regime shift points in the received network traffic signal based on varying statistical properties of the received network traffic signal;
determining, using the computing device, a segment of the network traffic signal based on the identified the set of regime shift points;
identifying, by the computing device that a cyclic pattern exists in the segment of network traffic signal;
responsive to identifying that the cyclic pattern exists, extracting, by the computing device, the cyclic from the segment of the network traffic signal;
generating, by the computing device, a residual segment of the network traffic signal based on the segment of the network traffic signal and the extracted cyclic pattern;
computing, by the computing device, a probability distribution of the residual segment of the network traffic signal;
detecting, by the computing device, that an anomaly exists in the segment of the network traffic signal based on statistical properties of the probability distribution of the residual signal;
responsive to detecting that the anomaly exists, determining, by the computing device, that there is a blockage of network service among the one or more network servers based on a magnitude of the anomaly and a magnitude of the network traffic signal; and responsive to detecting that the anomaly exists, reconfiguring, by the computing device, a network comprising the one or more network servers.

14. The method of claim 13, wherein:
a regime shift occurs when a trend in the received network traffic signal changes; and
the trend corresponds to one or more long-term fluctuations in the received network traffic signal.

15. The method of claim 14, further comprising:
determining a first trend before an identified regime shift point and a second trend, different from the first trend, after the identified regime shift point.

16. The method of claim 13, wherein:
a segment of data is a chunk of data that exists between two consecutive regime shift points, and
a cyclic pattern is a repetitive periodic feature occurring in the segment of the network traffic signal.

* * * * *